(12) United States Patent
Rached

(10) Patent No.: US 9,505,968 B2
(45) Date of Patent: Nov. 29, 2016

(54) TERNARY COMPOSITIONS FOR LOW-CAPACITY REFRIGERATION

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/873,891

(22) Filed: Oct. 2, 2015

(65) Prior Publication Data

US 2016/0024363 A1 Jan. 28, 2016

Related U.S. Application Data

(63) Continuation of application No. 14/335,281, filed on Jul. 18, 2014, now Pat. No. 9,175,203, which is a continuation of application No. 13/393,640, filed as application No. PCT/FR2010/051747 on Aug. 20, 2010, now abandoned.

(30) Foreign Application Priority Data

Sep. 11, 2009 (FR) .................................... 09 56249

(51) Int. Cl.
| | | |
|---|---|---|
| C09K 5/04 | (2006.01) | |
| F25B 1/00 | (2006.01) | |
| C08J 9/14 | (2006.01) | |
| C09K 3/30 | (2006.01) | |
| B01F 17/00 | (2006.01) | |
| C09K 3/00 | (2006.01) | |
| F25B 13/00 | (2006.01) | |

(52) U.S. Cl.
CPC ........... C09K 5/045 (2013.01); B01F 17/0085 (2013.01); C08J 9/146 (2013.01); C09K 3/00 (2013.01); C09K 3/30 (2013.01); F25B 13/00 (2013.01); C08J 2207/04 (2013.01); C09K 2205/126 (2013.01); C09K 2205/22 (2013.01); C09K 2205/40 (2013.01)

(58) Field of Classification Search
CPC ........... C09K 5/04; C09K 5/045; F25B 1/00; F25B 9/006
USPC ................................ 252/67, 68; 62/467, 468
See application file for complete search history.

(56) References Cited

U.S. PATENT DOCUMENTS

| | | | |
|---|---|---|---|
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 | 10/2013 | Rached | |
| 8,808,569 B2 | 8/2014 | Rached | |
| 8,858,824 B2 | 10/2014 | Boussand | |
| 8,858,825 B2 | 10/2014 | Guerin et al. | |
| 8,894,874 B2 | 11/2014 | Low | |
| 9,011,711 B2 | 4/2015 | Rached | |
| 9,028,706 B2 | 5/2015 | Rached et al. | |
| 9,039,922 B2 | 5/2015 | Rached | |
| 9,074,115 B2* | 7/2015 | Low | .......... C08J 9/146 |
| 9,127,191 B2 | 9/2015 | Rached | |
| 9,133,379 B2 | 9/2015 | Rached | |
| 9,175,203 B2* | 11/2015 | Rached | ..................... C08J 9/146 |
| 9,267,064 B2* | 2/2016 | Rached | ..................... C08J 9/146 |
| 9,399,726 B2 | 7/2016 | Rached | |
| 2006/0243944 A1 | 11/2006 | Minor et al. | |
| 2008/0184731 A1 | 8/2008 | Sienel et al. | |
| 2008/0230738 A1* | 9/2008 | Minor | .................. A62D 1/0057 252/67 |
| 2008/0314073 A1 | 12/2008 | Minor | |
| 2009/0120619 A1* | 5/2009 | Sievert | .................... F25B 40/00 165/104.27 |
| 2009/0253820 A1 | 10/2009 | Bowman | |
| 2010/0044619 A1 | 2/2010 | Hulse | |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0258147 A1 | 10/2011 | Low | |
| 2011/0284181 A1 | 11/2011 | Rached | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0097885 A9 | 4/2012 | Hulse et al. | |
| 2012/0126187 A1 | 5/2012 | Low | |
| 2012/0144857 A1 | 6/2012 | Rached | |
| 2012/0151958 A1 | 6/2012 | Rached | |
| 2012/0151959 A1 | 6/2012 | Rached | |

(Continued)

FOREIGN PATENT DOCUMENTS

| | | |
|---|---|---|
| DE | 20 2007 00829 U1 | 11/2007 |
| FR | 2 182 956 | 12/1973 |

(Continued)

OTHER PUBLICATIONS

Written Opinion (English translation) mailed Mar. 11, 2012 in PCT/FR2010/051747.

(Continued)

Primary Examiner — Douglas McGinty
(74) Attorney, Agent, or Firm — Buchanan Ingersoll & Rooney P.C.

(57) ABSTRACT

Compositions containing 2,3,3,3-tetrafluoropropene and to the uses thereof as heat transfer fluid, expansion agents, solvents and aerosol. Compositions essentially containing between 10 and 90 wt. % of 2,3,3,3-tetrafluoropropene, between 5 and 80 wt. % of HFC-134a and between 5 and 10 wt. % of HFC-32. Compositions essentially containing from 10 to 45% by weight of 2,3,3,3-tetrafluoropropene, from 50 to 80% by weight of HFC-134a and from 5 to 10% by weight of HFC-32.

14 Claims, No Drawings

(56) References Cited

U.S. PATENT DOCUMENTS

| | | | |
|---|---|---|---|
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1 | 8/2012 | Rached et al. | |
| 2012/0255316 A1 | 10/2012 | Andre et al. | |
| 2012/0298909 A1 | 11/2012 | Low | |
| 2013/0055733 A1 | 3/2013 | Rached | |
| 2013/0055739 A1 | 3/2013 | Rached | |
| 2013/0092869 A1 | 4/2013 | Boussand | |
| 2013/0096218 A1 | 4/2013 | Rached et al. | |
| 2013/0105724 A1 | 5/2013 | Boussand | |
| 2013/0145778 A1 | 6/2013 | Motta et al. | |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |
| 2014/0318160 A1 | 10/2014 | Rached | |
| 2014/0326017 A1 | 11/2014 | Rached | |
| 2015/0027146 A1 | 1/2015 | Boussand | |
| 2015/0075165 A1 | 3/2015 | Low | |
| 2015/0135765 A1* | 5/2015 | Yana Motta | C09K 5/045 62/498 |
| 2015/0152306 A1 | 6/2015 | Rached | |
| 2015/0152307 A1 | 6/2015 | Rached | |
| 2015/0322317 A1 | 11/2015 | Collier et al. | |
| 2015/0322321 A1 | 11/2015 | Deur-Bert et al. | |
| 2015/0344761 A1 | 12/2015 | Rached | |
| 2015/0353799 A1 | 12/2015 | Deur-Bert et al. | |
| 2015/0353802 A1 | 12/2015 | Rached | |
| 2016/0009555 A1 | 1/2016 | Bonnet et al. | |
| 2016/0025394 A1 | 1/2016 | Rached | |
| 2016/0194541 A1* | 7/2016 | Guerin | C09K 5/045 62/77 |
| 2016/0244652 A1 | 8/2016 | Rached | |

FOREIGN PATENT DOCUMENTS

| | | | | |
|---|---|---|---|---|
| FR | 2 256 381 | 7/1975 | | |
| GB | WO 2011023923 A1 * | 3/2011 | ............ | C08J 9/146 |
| JP | 58-104466 A | 6/1983 | | |
| JP | 2008-531836 A | 8/2008 | | |
| JP | 2009-532520 A1 | 9/2009 | | |
| JP | WO 2010002023 A1 * | 1/2010 | ............ | C09K 5/045 |
| WO | WO 2004/037913 A2 | 5/2004 | | |
| WO | WO 2005/105947 A2 | 11/2005 | | |
| WO | WO 2006/094303 A2 | 9/2006 | | |
| WO | WO 2006/101563 A2 | 9/2006 | | |
| WO | WO 2006/101563 A3 | 9/2006 | | |
| WO | WO 2007/126414 A2 | 11/2007 | | |
| WO | WO 2007/126414 A3 | 11/2007 | | |
| WO | WO 2008/009922 A2 | 1/2008 | | |
| WO | WO 2008/009923 A2 | 1/2008 | | |
| WO | WO 2008009928 A2 | 1/2008 | | |
| WO | WO 2010/000993 A2 | 1/2010 | | |
| WO | WO2010/002023 A1 | 1/2010 | | |
| WO | WO 2010/059677 A2 | 5/2010 | | |
| WO | WO 2011/023923 A1 | 3/2011 | | |
| WO | WO 2015/054110 A1 | 4/2015 | | |

OTHER PUBLICATIONS

International Search Report (English translation) mailed Jan. 13, 2011 in PCT/FR2010/051747.
Boussand, Béatrice, U.S. Appl. No. 14/371,118, entitled "Heat Transfer Compositions Having Improved Miscibility With Lubricating Oil," filed Jul. 8, 2014.
Collier, Bertrand, et al., U.S. Appl. No. 14/651,855, entitled "Composition Including 2,3,3,3-Tetrafluoropropene," filed Jun. 12, 2015.
Deur-Bert, Dominique, et al., U.S. Appl. No. 14/651,925, entitled "Composition Containing 2,3,3,3-Tetrafluoropropene and 1,2-Difluoroethylene," filed Jun. 12, 2015.
Deur-Bert, Dominique, et al., U.S. Appl. No. 14/655,500, entitled "Azeotropic or Quasi-Azeotropic Composition of Chloromethane," filed Jun. 25, 2015.
Rached, Wissam, U.S. Appl. No. 14/823,430, entitled "Use of Ternary Compositions," filed Aug. 11, 2015.
Rached, Wissam, U.S. Appl. No. 14/830,130, entitled "Binary Refrigerating Fluid," filed Aug. 19, 2015.
Bonnet, Phillippe, et al., U.S. Appl. No. 14/772,950, entitled "Composition Comprising HF and 2,3,3,3-Tetrafluoropropene," filed Sep. 4, 2015.
Rached, Wissam, U.S. Appl. No. 14/873,855, entitled "Heat Transfer Fluid," filed Oct. 2, 2015.
Guérin, Sophie, et al., U.S. Appl. No. 14/903,461, entitled, "2,3,3,3-Tetrafluoropropene Compositions Having Improved Miscibility," filed Jan. 7, 2016.
Boussand, Beatrice, et al., U.S. Appl. No. 14/990,159, entitled "Stable 2,3,3,3-Tetrafluoropropene Composition," filed Jan. 7, 2016
Rached, Wissam, U.S. Appl. No. 14/992,387, entitled, "Ternary Compositions for High-Capacity Refrigeration," filed Jan. 11, 2016
Rached, Wissam, et al., U.S. Appl. No. 15/073,108 entitled "Stabilization of 1-Chloro-3,3,3-Trifluoropropene," filed Mar. 17, 2016.
U.S. Appl. No. 15/189,936, filed Jun. 22, 2016, Wissam Rached.
U.S. Appl. No. 15/238,883, filed Aug. 17, 2016, Wissam Rached.
Rached, Wissam, U.S. Appl. No. 15/189,936 entitled "Use of Ternary Compositions," filed in the U.S. Patent and Trademark Office on Jun. 22, 2016.
Rached, Wissam, U.S. Appl. No. 15/238,883 entitled "Heat Transfer Fluid Replacing R-134a," filed in the U.S. Patent and Trademark Office on Aug. 17, 2016.

* cited by examiner

TERNARY COMPOSITIONS FOR LOW-CAPACITY REFRIGERATION

CROSS REFERENCE TO RELATED APPLICATIONS

The present application is a continuation of U.S. application Ser. No. 14/335,281, filed on Jul. 18, 2014, and has since issued as U.S. Pat. No. 9,175,203 on Nov. 3, 2015, which is a continuation of U.S. Application No. 13/393,640, filed on Mar. 1, 2012, (now abandoned) which is a U.S. national stage of International Application No. PCT/FR2010/051747, filed on Aug. 20, 2010, which claims the benefit of French Application No. 0956249, filed on Sep. 11, 2009. The entire contents of each of U.S. application Ser. No. 14/335,281, U.S. Application No. 13/393,640, International Application No. PCT/FR2010/051747, and French Application No. 0956249 are hereby incorporated herein by reference in their entirety.

TECHNICAL FIELD

The present invention relates to compositions containing 2,3,3,3-tetrafluoropropene and uses thereof as heat-transfer fluids, blowing agents, solvents and aerosols.

BACKGROUND

The problems posed by substances which delete the atmospheric ozone layer (ODP: ozone depletion potential) were addressed in Montreal, where the protocol imposing a reduction in the production and use of chlorofluorocarbons (CFCs) was signed. This protocol has been the subject of amendments which have required that CFCs be withdrawn and have extended regulatory control to other products, including hydrochlorofluorocarbons (HCFCs).

The refrigeration and air-conditioning industry has invested a great deal in the replacement of these refrigerants, and as a result, hydrofluorocarbons (HFCs) have been marketed.

The (hydro)chlorofluorocarbons used as blowing agents or solvents have also been replaced with HFCs.

In the automotive industry, the air-conditioning systems for vehicles sold in many countries have changed from a chlorofluorocarbon (CFC-12) refrigerant to a hydrofluorocarbon (1,1,1,2-tetrafluoroethane: HFC-134a) refrigerant which is less harmful to the ozone layer. However, from the viewpoint of the objectives set by the Kyoto protocol, HFC-134a (GWP=1300) is considered to have a high warming potential. The contribution to the greenhouse effect of a fluid is quantified by a criterion, the GWP (global warming potential) which indexes the warming potential by taking a reference value of 1 for carbon dioxide.

Since carbon dioxide is non-toxic and non-flammable and has a very low GWP, it has been proposed as a refrigerant in air-conditioning systems as a replacement for HFC-134a. However, the use of carbon dioxide has several drawbacks, in particular linked to the very high pressure at which it is used as a refrigerant in the existing apparatuses and technologies.

Document WO 2004/037913 discloses the use of compositions comprising at least one fluoroalkene having three or four carbon atoms, in particular pentafluoropropene and tetrafluoropropene, preferably having a GWP at most of 150, as heat-transfer fluids.

Document WO 2005/105947 teaches the addition to tetrafluoropropene, preferably 1,3,3,3-tetrafluoropropene, of a blowing coagent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses binary compositions of 2,3,3,3-tetrafluoropropene (HFO-1234yf) with difluoromethane (HFC-32), and of 2,3,3,3-tetrafluoropropene with 1,1,1,2-tetrafluoroethane (HFC-134a).

Quaternary mixtures comprising 1,1,1,2,3-pentafluoropropene (HFO-1225ye) in combination with difluoromethane, 2,3,3,3-tetrafluoropropene and HFC-134a were disclosed in this document. However, 1,1,1,2,3-pentafluoropropene is toxic.

Quaternary mixtures comprising 2,3,3,3-tetrafluoropropene in combination with iodotrifluoromethane ($CF_3I$), HFC-32 and HFC-134a have also been disclosed in document WO 2006/094303. However, $CF_3I$ has a non-zero ODP and poses stability and corrosion problems.

The applicant has now developed 2,3,3,3-tetrafluoropropene compositions which do not have the abovementioned drawbacks and have both a zero ODP and a GWP which is lower than that of the existing heat-transfer fluids such as and HFC-134a.

DETAILED DESCRIPTION

The compositions used as heat-transfer fluid in the present invention have values for the temperatures at the compressor outlet, and pressure levels, equivalent to the values given by HFC-134a. The compression ratios are lower. These compositions can replace HFC-134a without changing compressor technology.

The compositions used as a heat-transfer fluid in the present invention have volume capacities which are greater than the volume capacity of HFC-134a (between 116 and 133%). By virtue of these properties, these compositions can use smaller compressors and have the same heating or cooling capacity.

The compositions according to the present invention are characterized in that they essentially contain from 10 to 90% by weight of 2,3,3,3-tetrafluoropropene, from 5 to 80% by weight of HFC-134a and from 5 to 10% by weight of HFC-32.

Preferably, the compositions essentially contain from 10 to 45% by weight of 2,3,3,3-tetrafluoropropene, from 50 to 80% by weight of HFC-134a and from 5 to 10% by weight of HFC-32.

The compositions according to the present invention can be used as heat-transfer fluids, preferably in compression systems and advantageously with exchangers operating in counterflow mode or in cross-flow mode with counterflow tendency. They are particularly suitable for systems of low-capacity refrigeration per unit volume swept by the compressor.

In compression systems, the heat exchange between the refrigerant and the heat sources takes place by means of heat-transfer fluids. These heat-transfer fluids are in the gaseous state (the air in air-conditioning and direct expansion refrigeration), liquid state (the water in domestic heat pumps, glycolated water) or two-phase state.

There are various modes of transfer:
the two fluids are arranged in parallel and travel in the same direction: co-flow (antimethodic) mode;
the two fluids are arranged in parallel but travel in the opposite direction: counterflow (methodic) mode;

the two fluids are positioned perpendicularly: cross-flow mode. The cross-flow may be with co-flow or counter-flow tendency;

one of the two fluids makes a U-turn in a wider pipe, which the second fluid passes through. This configuration is comparable to a co-flow exchanger over half the length, and for the other half, to a counterflow exchanger: pinhead mode.

The compositions according to the present invention are advantageously used in stationary air conditioning and heat pumps, preferably as a replacement for HFC-134a.

The compositions according to the present invention can be stabilized. The stabilizer preferably represents at most 5% by weight relative to the total composition.

As stabilizers, mention may in particular be made of nitromethane, ascorbic acid, terephthalic acid, azoles such as tolutriazole or benzotriazole, phenolic compounds such as tocopherol, hydroquinone, t-butyl hydroquinone or 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl glycidyl ether or butylphenyl glycidyl ether, phosphites, phosphates, phosphonates, thiols and lactones.

The compositions according to the present invention, as a heat-transfer agent, can be employed in the presence of lubricants such as mineral oil, alkylbenzene, polyalkylene glycol and polyvinyl ether.

The compositions according to the present invention can also be used as blowing agents, aerosols and solvents.

EXPERIMENTAL SECTION

Calculation Tools

The RK-Soave equation is used for calculating the densities, enthalpies, entropies and liquid/vapor equilibrium data of the mixtures. The use of this equation requires knowledge of the properties of the pure bodies used in the mixtures in question and also the interaction coefficients for each binary mixture.

The data required for each pure body are:

The boiling point, the critical temperature and the critical pressure, the curve of pressure as a function of temperature starting from the boiling point up to the critical point, and the saturated liquid and saturated vapor densities as a function of temperature.

HFC-32, HFC-134a:

The data on these products are published in the ASHRAE Handbook 2005 chapter 20, and are also available from Refrop (software developed by NIST for calculating the properties of refrigerants).

HFO-1234yf:

The data of the temperature-pressure curve for HFO-1234yf are measured by the static method. The critical temperature and the critical pressure are measured using a C80 calorimeter sold by Setaram. The densities, at saturation as a function of temperature, are measured using the vibrating tube densitometer technology developed by the laboratories of the Ecole des Mines of Paris.

Interaction Coefficient of the Binary Mixtures:

The RK-Soave equation uses binary interaction coefficients to represent the behavior of the products in mixtures. The coefficients are calculated as a function of the experimental liquid/vapor equilibrium data.

The technique used for the liquid/vapor equilibrium measurements is the static-cell analytical method. The equilibrium cell comprises a sapphire tube and is equipped with two electromagnetic ROLSI™ samplers. It is immersed in a cryothermostat bath (HUBER HS40). A magnetic stirrer with a field drive rotating at varying speed is used to accelerate reaching the equilibria. The analysis of the samples is carried out by gas chromatography (HP5890 series II) using a katharometer (TCD).

HFC-32/HFO-1234yf, HFC-134a/HFO-1234yf:

The liquid/vapor equilibrium measurements on the binary mixture HFC-32/HFO-1234yf are carried out for the following isotherms: −10° C., 30° C. and 70° C.

The liquid/vapor equilibrium measurements on the binary mixture HFC-134a/HFO-1234yf are carried out for the following isotherms: 20° C.

HFC-32/HFO-134a:

The liquid/vapor equilibrium data for the binary mixture HFC-134a/HFC-32 are available from Refprop. Two isotherms (−20° C. and 20° C.) and one isobar (30 bar) are used to calculate the interaction coefficients for this binary mixture.

Compression System:

A compression system equipped with a counterflow condenser and evaporator, with a screw compressor and with an expansion valve is considered.

The system operates with 15° C. of overheat and 5° C. of undercooling. The minimum temperature difference between the secondary fluid and the refrigerant is considered to be about 5° C.

The isentropic efficiency of the compressors depends on the compression ratio. This efficiency is calculated according to the following equation:

$$\eta_{isen} = a - b(\tau - c)^2 - \frac{d}{\tau - e} \quad (1)$$

For a screw compressor, the constants a, b, c, d and e of the isentropic efficiency equation (1) are calculated according to the standard data published in the "Handbook of air conditioning and refrigeration, page 11.52".

The % CAP is the percentage of the ratio of the volumetric capacity supplied by each product over the capacity of HFC-134a.

The coefficient of performance (COP) is defined as being the useful power supplied by the system over the power provided or consumed by the system.

The Lorenz coefficient of performance (COPLorenz) is a reference coefficient of performance. It is a function of temperatures and is used for comparing the COPs of various fluids.

The Lorenz coefficient of performance is defined as follows:

(The temperatures T are in K)

$$T_{average}^{condenser} = T_{inlet}^{condenser} - T_{outlet}^{condenser} \quad (2)$$

$$T_{average}^{evaporator} = T_{outlet}^{evaporator} - T_{inlet}^{evaporator} \quad (3)$$

The Lorenz COP in the case of air-conditioning and refrigeration is:

$$COPlorenz = \frac{T_{average}^{evaporator}}{T_{average}^{condenser} - T_{average}^{evaporator}} \quad (4)$$

The Lorenz COP in the case of heating is:

$$COPlorenz = \frac{T_{average}^{condenser}}{T_{average}^{condenser} - T_{average}^{evaporator}} \quad (5)$$

For each composition, the coefficient of performance of the Lorenz cycle is calculated as a function of the corresponding temperatures.

The % COP/COPLorenz is the ratio of the COP of the system relative to the COP of the corresponding Lorenz cycle.

Heating Mode Results:

In heating mode, the compression system operates between a temperature for inlet of the refrigerant into the evaporator of −5° C. and a temperature for inlet of the refrigerant into the condenser of 50° C. The system supplies heat at 45° C.

The performance levels of the compositions according to the invention under the heating mode operating conditions are given in table 1. The values of the constituents (HFO-1234yf, HFC-32, HFC-134a) for each composition are given as percentage by weight.

TABLE 1

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| HFC-134a | | | −5 | 81 | 50 | 2.4 | 13.2 | 5.4 | 0.00 | 75.9 | 100 | 63.3 |
| 50 | 10 | 40 | −2 | 78 | 46 | 3.4 | 15.6 | 4.5 | 2.66 | 79.4 | 130 | 64.7 |
| 25 | 10 | 65 | −2 | 82 | 47 | 3.3 | 15.4 | 4.7 | 2.55 | 78.7 | 128 | 65.0 |
| 10 | 10 | 80 | −3 | 84 | 47 | 3.1 | 15.1 | 4.8 | 2.44 | 78.3 | 126 | 65.1 |

Cooling or Air-Conditioning Mode Results

In cooling mode, the compression system operates between a temperature for inlet of the refrigerant into the evaporator of −5° C. and a temperature for inlet of the refrigerant into the condenser of 50° C. The system supplies refrigeration at 0° C.

The performance levels of the compositions according to the invention under the cooling mode operating conditions are given in table 2. The values of the constituents (HFO-1234yf, HFC-32, HFC-134a) for each composition are given as percentage by weight.

TABLE 2

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| HFC-134a | | | −5 | 81 | 50 | 2.4 | 13.2 | 5.4 | 0.00 | 75.9 | 100 | 54.1 |
| 65 | 10 | 25 | −2 | 76 | 45 | 3.5 | 15.5 | 4.4 | 2.87 | 79.7 | 133 | 55.8 |
| 50 | 10 | 40 | −2 | 78 | 46 | 3.4 | 15.6 | 4.5 | 2.66 | 79.4 | 133 | 56.0 |
| 25 | 10 | 65 | −2 | 82 | 47 | 3.3 | 15.4 | 4.7 | 2.55 | 78.7 | 132 | 56.5 |
| 15 | 5 | 80 | −4 | 81 | 48 | 2.9 | 14.3 | 5.0 | 1.38 | 77.6 | 116 | 55.6 |
| 10 | 10 | 80 | −3 | 84 | 47 | 3.1 | 15.1 | 4.8 | 2.44 | 78.3 | 130 | 56.7 |

The invention claimed is:

1. A method of heat transfer comprising operating a compression refrigeration system to transfer heat, wherein the compression refrigeration system includes exchangers operating in countercurrent mode or in crossed-current mode with countercurrent tendency, and wherein the compression refrigeration system includes a heat-transfer fluid comprising a refrigerant consisting essentially of from 50 to 90% by weight of 2,3,3,3-tetrafluoropropene, from 5 to 40% by weight of HFC-134a and from 5 to 10% by weight of HFC-32.

2. The method as claimed in claim 1, wherein the heat-transfer fluid further comprises a stabilizer.

3. The method as claimed in claim 2, wherein the stabilizer is selected from the group consisting of nitromethane, ascorbic acid, terephthalic acid, azoles, phenolic compounds, epoxides, phosphites, phosphates, phosphonates, thiols and lactones.

4. The method as claimed in claim 2, wherein stabilizer represents at most 5% by weight relative to the refrigerant.

5. The method as claimed in claim 1, wherein the heat-transfer fluid further comprises a lubricant.

6. The method as claimed in claim 5, wherein the lubricant is selected from the group consisting of mineral oil, alkylbenzene, polyalkylene glycol and polyvinyl ether.

7. The method as claimed in claim 1, wherein the refrigerant consists of from 50 to 90% by weight of 2,3,3,3-tetrafluoropropene, from 5 to 40% by weight of HFC-134a and from 5 to 10% by weight of HFC-32.

8. A method of heat transfer comprising operating a heat transfer system, wherein the heat transfer system comprises a heat-transfer fluid including a refrigerant consisting essentially of from 50 to 90% by weight of 2,3,3,3-tetrafluoropropene, from 5 to 40% by weight of HFC-134a and from 5 to 10% by weight of HFC-32.

9. The method as claimed in claim 8, wherein the heat-transfer fluid further comprises a stabilizer.

10. The method as claimed in claim 9, wherein the stabilizer is selected from the group consisting of nitromethane, ascorbic acid, terephthalic acid, azoles, phenolic compounds, epoxides, phosphites, phosphates, phosphonates, thiols and lactones.

11. The method as claimed in claim 9, wherein stabilizer represents at most 5% by weight relative to the refrigerant.

12. The method as claimed in claim 8, wherein the heat-transfer fluid further comprises a lubricant.

13. The method as claimed in claim 12, wherein the lubricant is selected from the group consisting of mineral oil, alkylbenzene, polyalkylene glycol and polyvinyl ether.

14. The method as claimed in claim 8, wherein the refrigerant consists of from 50 to 90% by weight of 2,3,3,3-tetrafluoropropene, from 5 to 40% by weight of HFC-134a and from 5 to 10% by weight of HFC-32.

* * * * *